United States Patent [19]

Hosobuchi et al.

[11] Patent Number: 5,067,154
[45] Date of Patent: Nov. 19, 1991

[54] TERMINAL MANAGEMENT METHOD AND APPARATUS

[75] Inventors: Yoshiyuki Hosobuchi; Takayuki Takahashi, both of Hadano, Japan

[73] Assignee: Hitachi, Ltd., Tokyo, Japan

[21] Appl. No.: 508,110

[22] Filed: Apr. 11, 1990

[30] Foreign Application Priority Data

Apr. 17, 1989 [JP] Japan .................................. 1-095112

[51] Int. Cl.$^5$ .............................................. H04L 9/00
[52] U.S. Cl. ......................................... 380/25; 380/24
[58] Field of Search ............... 380/24, 25; 340/825.07, 340/825.52; 364/242.95

[56] References Cited

U.S. PATENT DOCUMENTS

| | | | |
|---|---|---|---|
| 4,675,815 | 6/1987 | Kuroki et al. | 380/24 |
| 4,746,788 | 5/1988 | Kawana | 380/24 |
| 4,757,543 | 7/1988 | Tamada et al. | 380/24 |
| 4,862,501 | 8/1989 | Kamitake et al. | 380/25 |
| 4,879,645 | 11/1989 | Tamada et al. | 380/24 |
| 4,879,747 | 11/1989 | Leighton et al. | 380/24 |
| 4,894,784 | 1/1990 | Smith | 380/24 |
| 4,933,969 | 1/1990 | Marshall et al. | 380/25 |

FOREIGN PATENT DOCUMENTS

61-173549  8/1986  Japan .

Primary Examiner—Thomas H. Tarcza
Assistant Examiner—David Cain
Attorney, Agent, or Firm—Kenyon & Kenyon

[57] ABSTRACT

An information processing system includes a host computer, an ID number management file for storing user discrimination information such as ID number, and a terminal system group such as work stations, responsive to a recording medium such as an ID magnetic card or IC card written with the discrimination information stored in the management file, for the data processing with the host computer. The management file records therein the user discrimination information for uniquely discriminating a user. An apparatus is provided for recording, in accordance with the recorded user discrimination information, in the recording medium the discrimination information specific to the discriminated user. A process is carried out or an apparatus is provided, at the terminal system to be used by a user, whereby the discrimination information recorded in the recording medium is entered, and in accordance with the entered discrimination information, an address of the terminal system is set.

18 Claims, 6 Drawing Sheets

OVERALL SYSTEM OUTLINE

FIG. 2
ISSUE OF ID CARD

FIG. 3 ID CARD ISSUE CONTROL BY SYSTEM MANAGER

| SQN | USER NAME | ID NUMBER | BRANCH COMPUTER | TOLL | ACCESS TIME | |
|---|---|---|---|---|---|---|
| | | | | | START | END |
| 001 | TARO YAMADA | a a a | DP-A | 3000 | 8:00 | |
| 002 | JIRO SATO | b b b | DP-A | 500 | 10:00 | |
| 003 | SABURO SUZUKI | c c c | DP-B | 1000 | 8:30 | 12:00 |
| ... | ... | ... | ... | ... | ... | ... |

FIG. 8

| ID NUMBER | |
|---|---|
| BRANCH NUMBER | OFFICE TITLE NUMBER · SERIAL NUMBER |

TERMINAL MANAGEMENT METHOD AND APPARATUS

BACKGROUND OF THE INVENTION

The present invention relates to an on-line terminal management method and apparatus, and more particularly to a terminal management method and apparatus for an information processing system capable of reducing terminal change/maintenance works upon new system generation.

Conventionally, when a new terminal is to be connected to a central computer of an on-line system such as banking systems and securities dealing systems, this new terminal is assigned a fixed terminal address that is written in a predetermined area of a disk of the terminal by using switches or a keyboard. Accordingly if a new terminal is additionally installed or transferred to another location, a system manager is required to check whether an assigned terminal address is the same as any one of the already assigned terminal addresses, and if there any one that matches, the system manager is required to again assign another terminal address not coincident with already assigned terminal addresses.

According to another method as disclosed in, e.g., Japanese Patent Laid-open Publication JP-A-61-173549, if a terminal is additionally installed or transferred to another location, the contents of a data table in an auxiliary storage connected to, and collectively managed by, a central computer, are updated. Therefore, it suffices only if the terminal requests the central computer to transfer the information in the data table when necessary. The data table includes therein a terminal attribute, address table, command table and other tables. With this method, although the amount of work necessary for a new system generation is reduced, the work of updating the data table is still required to be carried out by a system manager. Consequently, in adding a new terminal to a local area network (LAN) connected to a central computer or in transferring an already installed terminal to another LAN, it is necessary for a system manager to check whether an assigned terminal address of a terminal to be added or transferred is the same as any one of already assigned terminal addresses, and if there is a matching address, to again assign another terminal address not coincident with already assigned terminal addresses.

With the above-described prior art, a terminal address is assigned to each terminal independently from, and irrelevant to, already assigned terminal addresses. Therefore, a system manager is required to check an assigned terminal address of a terminal to be additionally installed or transferred. In order to avoid a duplicated terminal address, cumbersome manual terminal address assignment together with the setting operations of the terminal address and terminal attribute is required, thereby imposing a large burden on a system manager.

SUMMARY OF THE INVENTION

The present invention provides a terminal management method and apparatus for an on-line system capable of automatic terminal address management.

The present invention also provides a terminal management method and apparatus capable of dynamically setting a terminal address during the initializing process at each terminal, and checking the validity of a terminal system user.

According to one aspect of the present invention, a host system supervises the discrimination information by which system users can be discriminated uniquely or unambiguously. A recording medium storing the discrimination information is provided to each system user. The discrimination information in the recording medium is entered during the initializing process at a terminal by a system user. The terminal address and terminal attribute are generated from the discrimination information in accordance with a predetermined manner and set to the terminal. The host system also determines the validity of, and allowable access range by, the terminal system user by checking a correspondence between the security information included in the entered discrimination information and the discrimination information stored in a management file of the host system, to thereby permit or inhibit the system user to use the system, and to limit the access range by the terminal system user.

The host system supervises the discrimination information by which system users are uniquely discriminated, and a recording medium given to each system user is written with its corresponding discrimination information. Each terminal is not previously assigned a particular terminal address, but the terminal address is unambiguously determined every time a system user enters the discrimination information by using the recording medium. Accordingly, no duplicated terminal address is generated and the addition/transfer of terminals ca be freely carried out. In addition, the validity of a system user at a terminal can be checked on the basis of the security information.

According to another aspect of the present invention, a terminal or work station connected to a LAN has a discrimination information reader for reading the user discrimination information which uniquely determines the terminal address, the discrimination information being stored in a recording medium such as a magnetic card or IC card. LAN is connected to distributed (branch) computers which are connected via a wide area network to a central computer (host system). The host system has a user management file containing the user discrimination information. While referring to the user management file, the host system determines the discrimination information not the same as any one of already issued terminal addresses, i.e., discrimination information so that an ID issue machine issues a recording medium written with the determined discrimination information. The host system stores the determined discrimination information in the user management file to always update the file. A copy of the user management file may be provided at each branch. In this case, each time an initializing process is carried out at a terminal, the corresponding branch computer checks a correspondence between the discrimination information of a terminal set with a terminal address and the security information included in the discrimination information, and checks the validity of the system user.

DETAILED DESCRIPTION OF THE EMBODIMENTS

Figure 1:
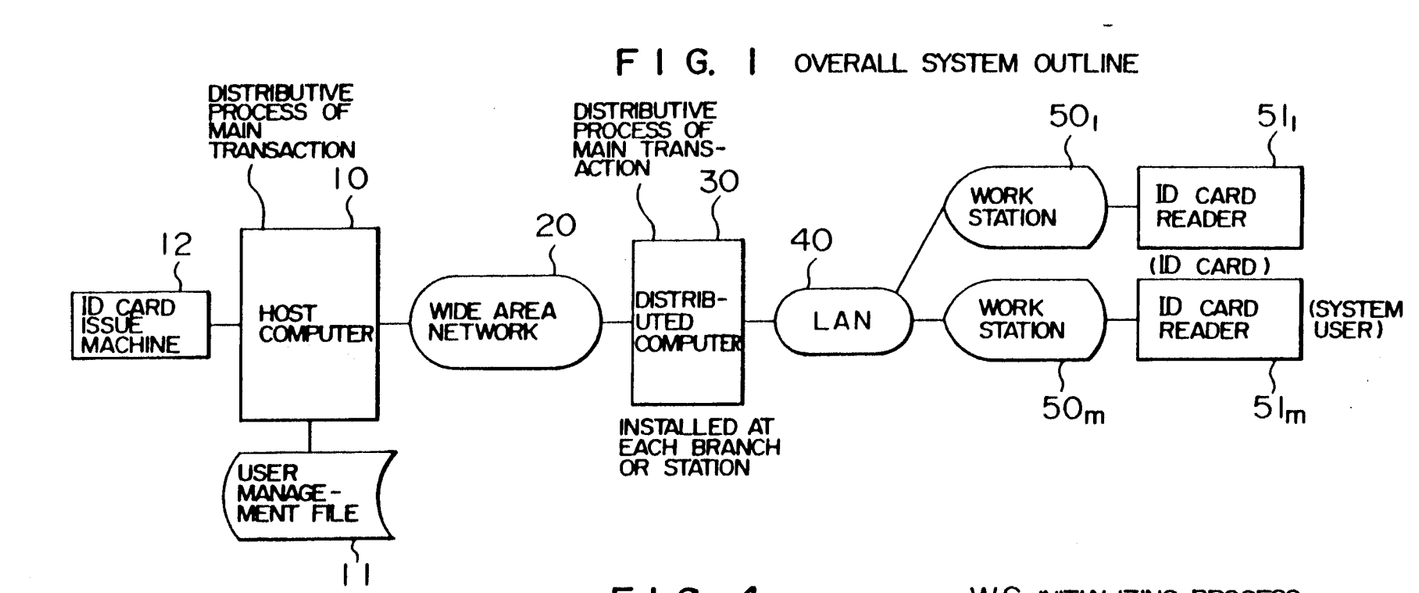
FIG. 1 is a block diagram showing the overall arrangement of a system to be used for explaining an embodiment of the present invention.

FIG. 1 is a schematic diagram showing an embodiment of the system arrangement of the present invention. In FIG. 1, reference numeral 10 represents a host computer such as a central computer having a data base, 11 is a user management file, 12 is an ID card issue machine, 20 is a wide area network such as ISDN, 30 is a distributed computer such as a distributed station or branch computer, 40 is a local area network, 50 is a work station or the like serving as one of a plurality of terminal equipments ($50_1$–$50_m$, m: positive integers), and 51 one of a plurality of ID card readers ($51_1$–$51_m$). A copy of the user management file 11 may be provided at the distributed computer 30.

The host computer (hereinafter called Host) 10 is on-line or off line connected to the user management file 11 and ID issue machine 12 so that a recording medium (in this case an ID card) for a particular user can be issued. Discrimination information (in this case, ID number) for uniquely discriminating each system user is written on the ID card which is then given to a particular system user. Host 10 is also connected to the wide area network 20. The distributed computer (hereinafter abbreviated as DP) 30 is installed at each branch or station, and connected to the wide area network 20. Each workstation (hereinafter abbreviated as WS) 50 is connected to an ID card reader 51. A system user at WS 50 produces the discrimination information written in the ID card and read with the ID card reader 51. The information is sent to Host 10.

Generally, a plurality of WSs 50 are installed at each branch, and WSs 50 and DP 30 are interconnected by the local area network (hereinafter abbreviated as LAN) 40. This system constructed as above is a large scale on-line system whereby main transactions are distributably processed at Host 10 and DP 30. WS 50 has a program for executing a predetermined function by which an ID number is converted into a terminal address.

When a system user causes its ID card to be read with the ID card reader 51, the terminal address of WS 50 is determined in accordance with the inputted ID number by using the above-described program executing the predetermined function stored in WS 50. A transaction is carried out by the system user at WS 50 while communicating with DP 30 and Host 10. A newly installed WS 50 has initially no terminal address, but the address is set at WS 50 only after an ID card is read and its discrimination information is entered. The ID number is managed by the user management file 11 of Host 10 so as to update and always maintain unique the ID number. Duplicated terminal addresses therefore never occur.

In this embodiment, as an ID card is given to a particular system user, and the terminal address is uniquely assigned to that user. Since the terminal address is managed irrespective of a physical device, i.e., WS, no duplicated terminal addresses occur upon addition/transfer of WSs, thereby allowing the addition/transfer of WSs as desired, independently from the terminal address.

Figure 2:
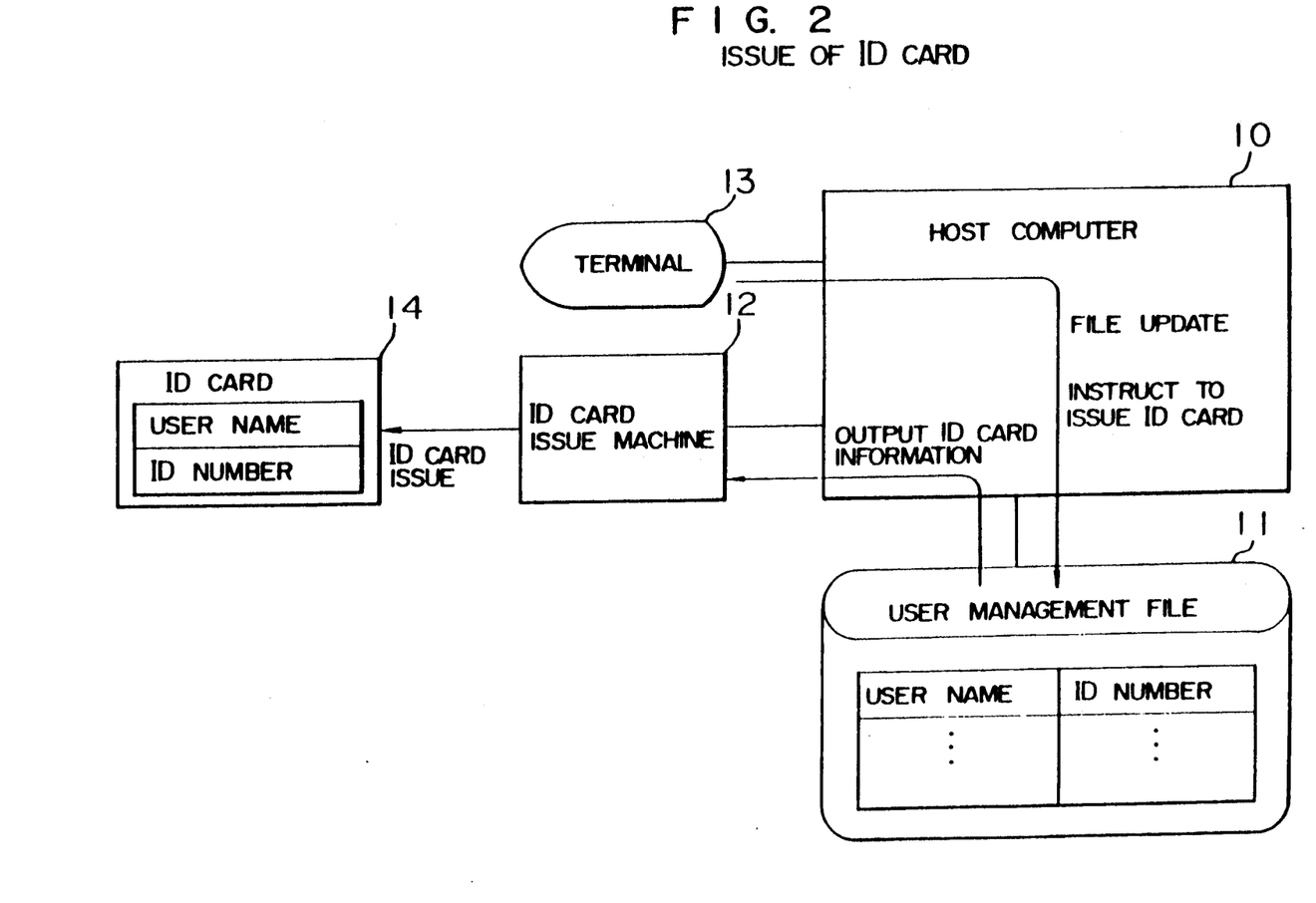
FIG. 2 is a diagram used for explaining an example of issuing an ID card.

FIG. 2 is a block diagram used for explaining the issue of ID cards to system users.

In FIG. 2, reference numeral 10 represents a Host computer, 11 a user management file, 12 is an ID card issue machine, 13 is a manager terminal equipment, and 14 is an ID card. A system manager supervises system users in the following manner.

A system manager operates upon the manager terminal equipment 13, connected to Host 10, to register the names and ID numbers of all system users in the user management file 11 connected to Host 10. Each ID number includes, for example, a pass word determined by Host 10. ID numbers in correspondence with respective use names are set so as not to be duplicated, by using a known program.

A system manager also operates upon the manager terminal 13 to extract a system user name and ID number from the user management file 11 which are supplied to the ID card issue machine 12 connected to Host 10 to thereby issue an ID card 14 to that system user. The pass word is notified to the system user when the ID card is given to the user. The pass word may be changed upon request from a system user.

Figure 3:
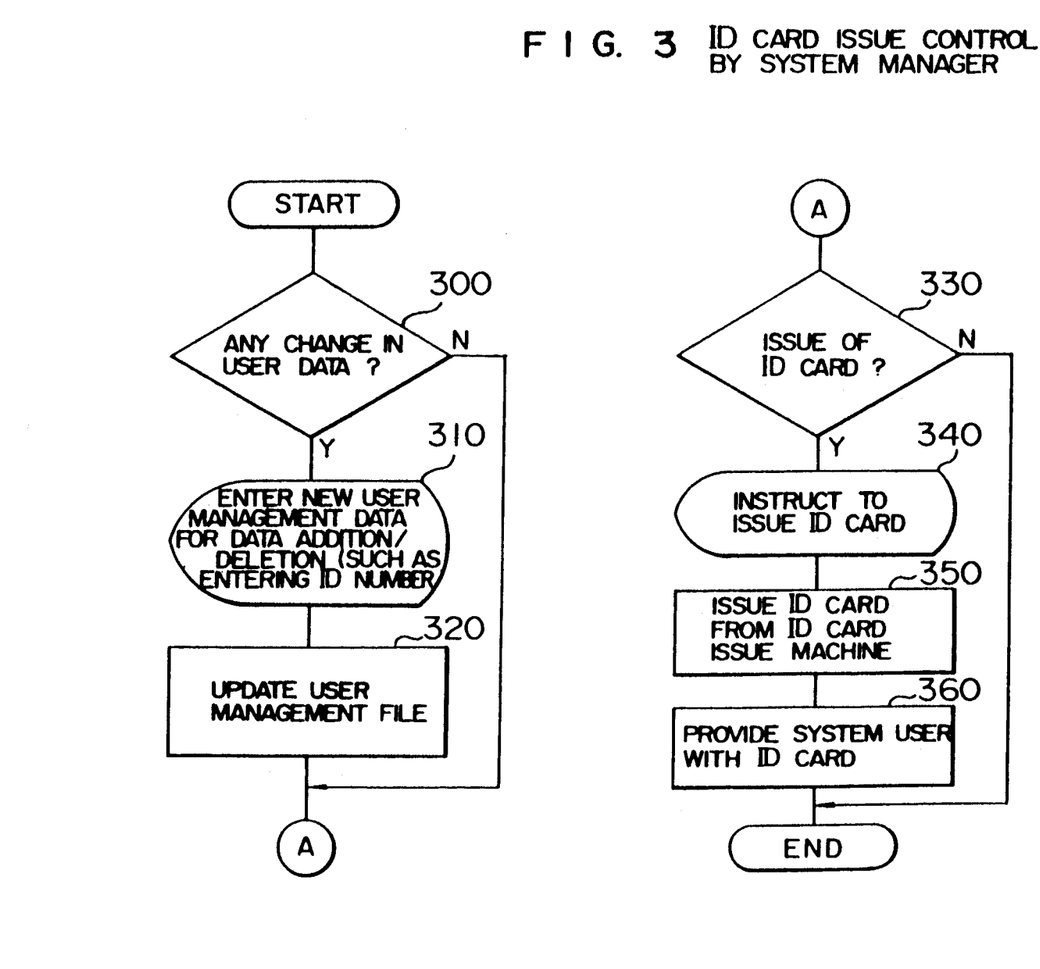
FIG. 3 is a flow chart illustrating an ID card issue processing program.

FIG. 3 is an example of a flow chart illustrating the ID card issue program. The ID card issue control by a system manager will be described with reference to the flow chart of FIG. 3.

If there occurs a change in system user data (step 300), a system manager enters the ID numbers of added, deleted or changed system users (step 310) and updates the user management file (step 320). If an ID card is requested to be issued (step 330), the system manager enters an ID card issue command (step 340) to issue an ID card 14 from the ID card issue machine (step 350). The system manager gives the issued ID card 14 to the system user (step 360).

Figure 4:
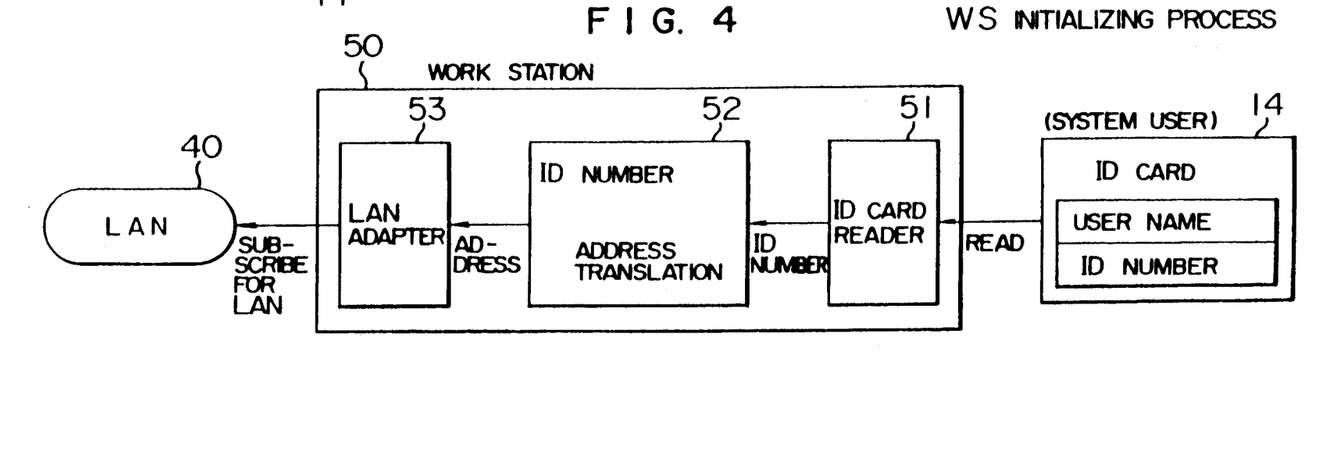
FIG. 4 is a block diagram used for explaining the work station initializing process.

FIG. 4 is a block diagram illustrating the initializing process by a workstation WS.

In FIG. 4, reference numeral 14 represents an ID card, 40 is a LAN, 50 is a WS, 51 is an ID card reader, 52 is an address converter program for converting an ID number into a terminal address, and 53 is a LAN adapter.

Prior to execution of a transaction at WS 50, a system user causes the ID card 14 to be read with the ID card reader 51. In this case, the ID card 14 may be read in connection with an arbitrary WS 50 no matter what ID number the ID card 14 carries with it is. The ID number read from the ID card 14 with the ID card reader 51 is transferred to the address converter program 52. This program 52 operates to determine a terminal address for the ID number. In this case, the ID number may be used as the terminal address on condition that there is coincidence between the ID number and terminal address as to their numbers of digits, whether codes representative of alphanumeric type whether numerals only or characters only are used, and other requirements. In such a case, the address conversion process is not needed. The determined terminal address is set to the LAN adapter 53.

Thereafter, WS 50 subscribes for LAN 40 by using the determined terminal address to transmit a connection request to a Host system. After receiving a response message from the Host system, the system user is allowed to carry out a transaction by using WS 50. The term "Host system" herein used should be construed to be inclusive of Host 10 and DP 30. Host 10 and DP 30 may be configured in parallel, with functions of data base server and processor server being provided to each.

Figure 5:
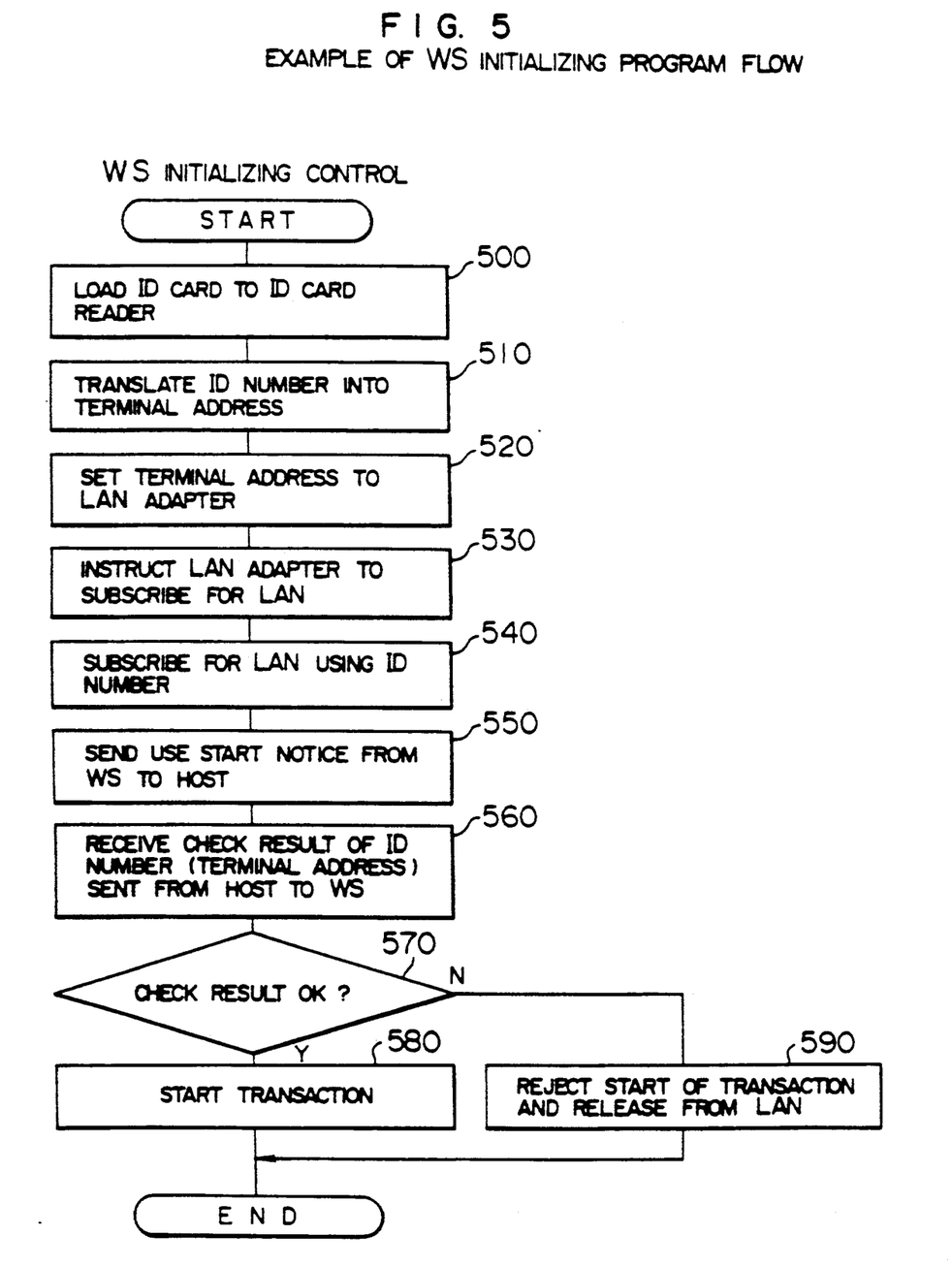
FIG. 5 is a flow chart used for explaining the work station initializing process.

FIG. 5 shows an example of a flow chart illustrating the WS initializing program.

The initializing control by WS 50 will be described with reference to the exemplary flow chart of FIG. 5.

Prior to operating upon WS 50, a system user first enters a pass word and causes the ID card 14 to be read with the ID card reader 51 of the WS 50 of interest (step 500). At WS 50, the read ID number is checked for the comparison with the entered pass word, and if verified, the ID number is converted into a terminal address (step 510). WS 50 sets the terminal address to the LAN adapter 53 (step 520), and sends a LAN subscription instruction thereto (step 530). After subscribing for LAN (step 540), WS 50 notifies Host 10 of a start of use (step 550). Host 10 checks if the address of WS 50 established by entry of the user from which address the use start notice has been sent, is present in the entry of the corresponding ID number in the user management file, and also checks the pass word in that entry, and thereafter the check results are sent back to WS 50. If the check is asserted (step 570), a transaction starts at WS 50 (step 580), whereas if the check is negated (step 570), the system user is rejected to start carrying out the transaction at WS 50 which is then released from LAN (step 590).

In this embodiment, an ID card is given for the discrimination of a system user. Instead of an ID card, other portable recording medium may also be used, such as a floppy disk, IC card, CD-ROM and the like.

Figure 6:
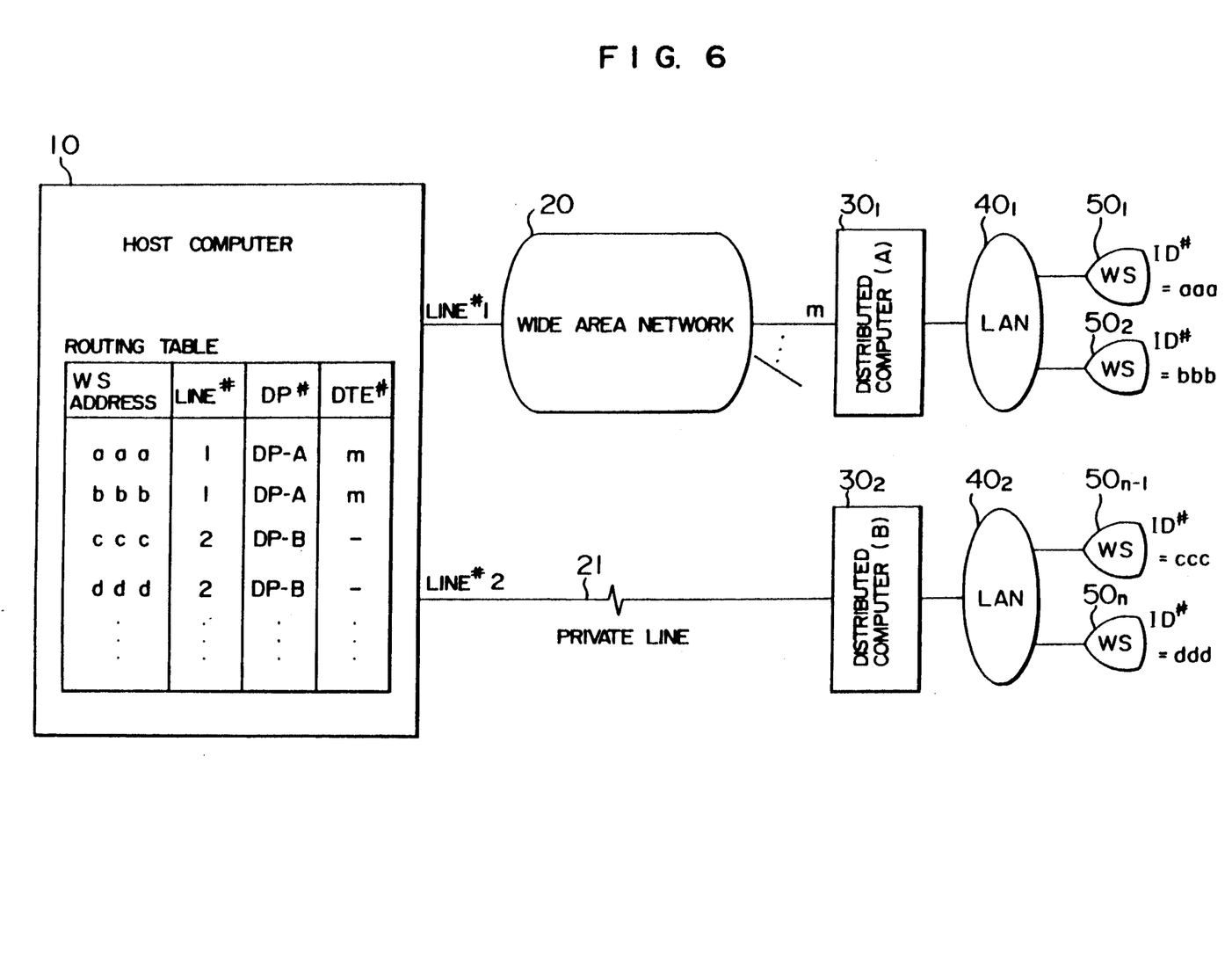
FIG. 6 is a diagram showing a routing table of a host computer.

FIG. 6 is a diagram showing the overall system arrangement with respect to an exemplary routing table at Host, according to another embodiment of the present invention.

In FIG. 6, a reference numeral 10 represents a host computer or Host, 20 is a wide area network, 21 is a private line, $30_1$ and $30_2$ are a distributed computers or DPs, $40_1$ and $40_2$ are a local area networks or LANs, and $50_1$ to $50_2$ are work stations or WSs. WSs $50_1$ to $50_n$ are connected to Host 10 via DSs $30_1$ and $30_2$ and the wide area network 20 or private line 21.

Each WS $50_1$ to $50_n$ sends a use start notice to Host 10 in accordance with the procedure illustrated by the flow chart of FIG. 5. Upon reception of a use start notice from each WS $50_1$ to $50_n$, Host 10 registers the terminal address affixed to the use start notice in the routing table of Host 10.

The used line number, the originating DS number, and in case of the wide area network, the data terminal equipment address, are also registered in correspondence with the registered terminal address. In transmitting a response to the use start notice after checking the ID number, Host 10 refers to the routing table to identify the used line and originating DP so that the response affixed with the terminal address is sent back to the originating one of DPs $30_1$ to $30_n$. The originating one of DPs $30_1$ to $30_n$ sends as the destination address the terminal address affixed to the response and sent from Host 10, to the originating one of LANs $40_1$ and $40_2$. Each WS $50_1$ to $50_n$ receives or picks up the response during the initializing process if the destination address sent from the originating one of LANs $40_1$ to $40_n$ coincides with its own address.

If each WS $50_1$ to $50_n$ sends a use end notice to Host 10, the corresponding entry in the routing table is deleted. In this case, the entry deleted from the routing table may be stored in the user management file so that if Host 10 wishes to communicate with a system user not using WS, a message may be transmitted to the corresponding DP or to the lower hierarchical corresponding WS. Accordingly, the system user management system of this invention can be applied also to an electronic mail system.

Figure 7:
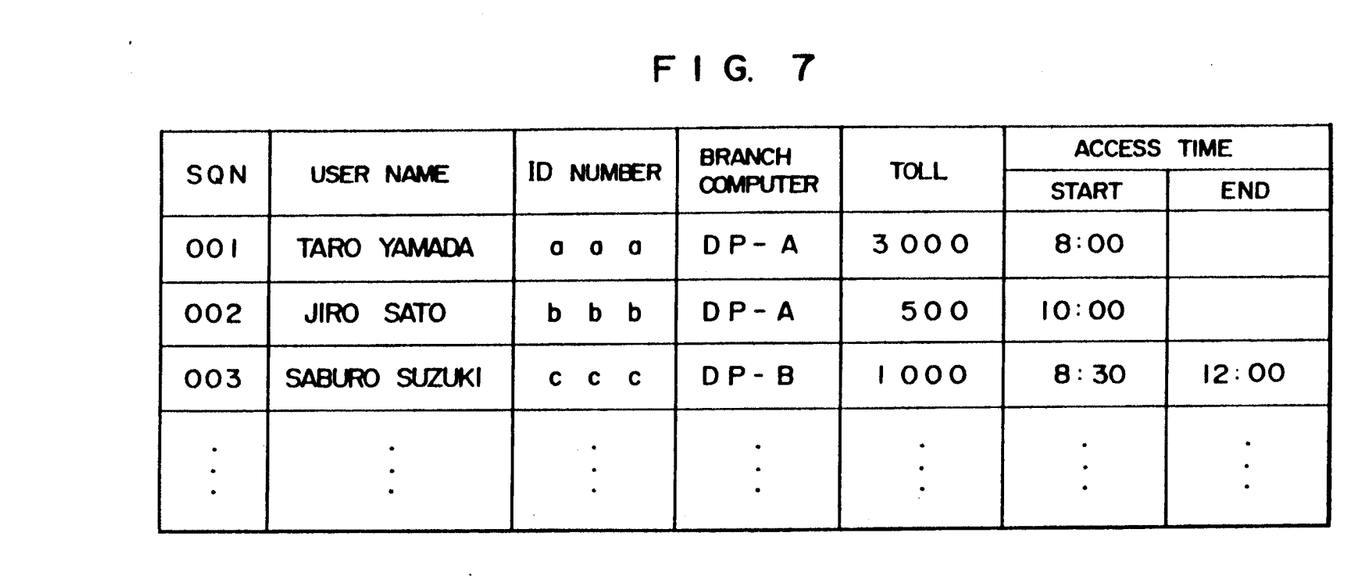
FIG. 7 is an extended user management file.

FIG. 7 shows the contents of the user management file in accordance with another embodiment of the present invention.

In contrast with the user management file shown in FIG. 2 which stores therein only user names and their ID numbers, the user management file shown in FIG. 7 stores therein additional management information attributable to users. For example, the DP number, which can be notified upon reception of a use start notice as described above, is registered in the user management file. It seldom occurs that DP once installed at one branch is transferred to another branch. For this reason, if correspondence between the DP number and the branch at the DP installation site is arranged to be recognized, the location of a system user can be managed by referring to the registered DP number In addition, since the user management file manages the information independently for each system user, the toll information for each user can be collectively managed by storing the toll information regarding the CPU occupied time, line used time and the like.

Further, the user management file may be used for the management of office attendance of each system user by storing every day the times of the us start and end notices, for each system user.

Figure 8:
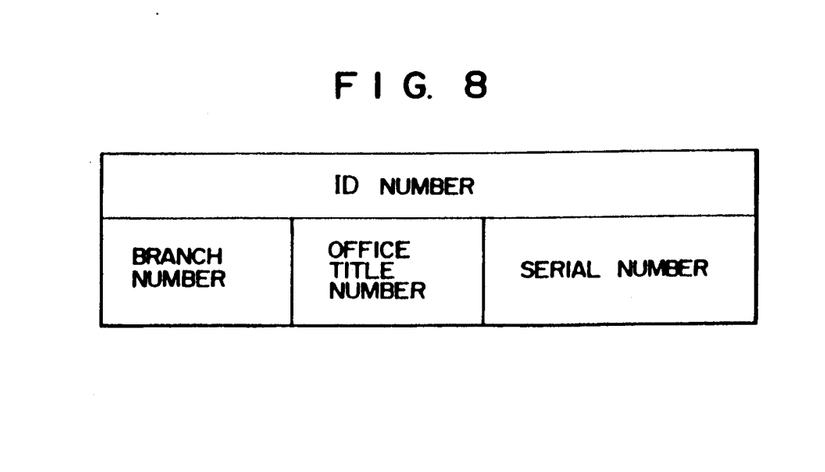
FIG. 8 shows an example of a hierarchic arrangement of an ID number.

FIG. 8 shows an example of a hierarchical arrangement of an ID number according to a further embodiment of this invention. With this hierarchical ID number having a plurality of attributes for respective hierarchical stages, the ID number can be used in identifying a particular attribute of a system user. For example, as shown in FIG. 8, a menu to be displayed may be selected in accordance with a branch number, or an execution of particular transaction may be allowed in accordance with an office title number. Specifically, in accordance with the ID number which may be an employee number, and hierarchical information stored together with, or separately from, the ID number, a supply section is allowed to see a menu of its dealers or a section manager is allowed to carry out totaling dealing data of all members of that section.

According to this invention, a terminal address and user attribute can be automatically set. Accordingly, it is not necessary for a system manager to allocate a terminal address upon addition/transfer of WSs. Further, a system user carrying a recording medium can use any WS, and a Host can check the security information to protect a particular transaction.

What is claimed is:

1. A terminal management method for an information processing system including a host system, means for storing user discrimination information, and a plurality of terminal systems, each terminal system having a variably settable address that is responsive to a recording medium written with discrimination information stored in the means for storing, thereby enabling an information processing with the host system, comprising the steps of:

recording user discrimination information in said means for storing, said user discrimination information uniquely discriminating a user, and storing in said recording medium said discrimination information specific to said discriminated user, in accordance with said user discrimination information recorded in said means for storing; and entering said discrimination information recorded in said recording medium in any one of said plurality of terminal systems to set thereto an address of said terminal system correspondingly to said discrimination information specific to said discriminated user.

2. A method according to claim 1, wherein an address of said terminal system is updated each time said user discrimination information is read upon mounting of said recording medium at said terminal system.

3. A method according to claim 1, wherein said entered discrimination information specific to said discriminated user is translated into a terminal address in accordance with a program stored in said terminal system.

4. A terminal management method for an information processing system including a host system, discrimination information management file connected to the host system storing user discrimination information for uniquely discriminating a user, means for recording the user discrimination information in an external recording medium, a terminal system having input means for entering the user discrimination information stored in the recording medium to changeably establish an address of the terminal system, and a network connected to a plurality of the terminal systems for establishing a communication path between the terminal system and the host system, comprising the steps of:

providing a terminal system user with said recording medium;

determining an address of said terminal system in each initializing process of said terminal system using said user discrimination information from said recording medium loaded at said input means by a terminal system user; and setting said terminal system address to said terminal system.

5. A terminal management method according to claim 4, wherein said user discrimination information stored in said management file and in said recording medium includes security information for checking the validity of a terminal system user, and said method further comprising:

a step of sending, after said terminal system address determining step, said user discrimination information including said security information from said terminal system to said host system, and sending a use start notice; and a step of checking by said host system the validity of said terminal address while referring to said management file sending back the check results to said terminal system to permit or inhibit the use of said terminal system.

6. A terminal management method according to claim 5, wherein said user discrimination information includes a discrimination code uniquely discriminating a user and a pass word, and said method further comprising the step of converting said discrimination code into a terminal address if said discrimination code includes a combination of alphabet based and numeral based symbols.

7. A terminal management method according to claim 5, wherein said network includes a local area network, said host system comprises a host computer and a plurality of distributed computers connectable to said host computer via said network, said host computer includes a routing table storing the terminal address of said terminal system from which said host computer received said use start notice, and said routing table registers a line attribute of said communication path and a distributed computer attribute, respectively of said terminal system which sent said use start notice.

8. A terminal management method according to claim 7, wherein said host computer responds to said user start notice from said terminal system, deletes the corresponding entry of said routing table, and stores the deleted entry contents in said file means.

9. A terminal address management method for an information processing system including a host system and a terminal system, said host system comprising means for storing user discrimination information uniquely discriminating a user and means for recording the discrimination information in an external recording medium, and said terminal system comprising means for entering said discrimination information recorded in said recording medium to changeably establish an address of the terminal system said method comprising the steps of:

providing a terminal system user with said recording medium produced at said host system; and determining at said terminal system an address of said terminal system using said user discrimination information recorded in said recording medium every time the recording medium is entered into said terminal system.

10. A terminal address management method according to claim 9, wherein said user discrimination information includes security information.

11. An information processing system including a host system, means for storing user discrimination information, and a terminal system responsive to entry of a recording medium written with the discrimination information stored in the means for storing the terminal system performing information processing with the host system, comprising:

means for storing user discrimination information in said storage means, said user discrimination information uniquely discriminating a user, and providing said recording means with said discrimination information specific to said discriminated user in accordance with said user discrimination information; and terminal address setting means, provided at said terminal system and responsive to entering of said discrimination information recorded in said recording medium for changeably setting a unique address of said terminal system using said discrimination information specific to said discriminated user.

12. An information processing system according to claim 11, wherein said terminal address setting means includes means for updating the address of said terminal system each time said user discrimination information is read during an initializing process upon mounting of said recording medium at said terminal system.

13. An information processing system according to claim 11, wherein said terminal system comprises means for converting said entered discrimination information specific to said discriminated user into a terminal address in accordance with a program stored in said terminal system.

14. An information processing apparatus comprising:
a host system;
discrimination information management file connected to said host system and adapted to store user discrimination information for uniquely discriminating a user;
means for recording said user discrimination information in an external recording medium;
a terminal system having input means for entering said user discrimination information stored in said recording medium;
network means connected to a plurality of said terminal systems for establishing a communication path between said terminal system and said host system; and
means for producing an address of said terminal system in each initializing process of said terminal system using said user discrimination information from said recording medium loaded at said input means by a terminal system user, thereby setting the produced terminal system address as the address of terminal system.

15. An information processing apparatus according to claim 14, wherein said user discrimination information stored in said management file means and in said recording medium includes security information for checking the validity of a terminal system user, and said system further comprising:
means, coupled to said terminal system address determining means, for sending said user discrimination information including said security information from said terminal system to said host system, and outputting a use start notice; and
said host system comprising validity of said terminal address while referring to said management file, sending back the check results to said terminal system and to notify of a permission or inhibition of the use of said terminal system.

16. An information processing apparatus according to claim 14, wherein said user discrimination information includes a discrimination code uniquely discriminating a user and a pass word, and said system further comprising:
means for converting said discrimination code into a terminal address by discriminating whether said discrimination code includes a combination of alphabets based and and numeral based symbols.

17. An information processing apparatus according to claim 14, wherein said network includes a local area network, said host system comprises a host computer and a plurality of distributed computers connectable to said host computer via said network, said host computer includes a routing table storing the terminal address of said terminal system from which said host computer received said use start notice, and said routing table registers a line attribute of said communication path and a distributed computer attribute, respectively of said terminal system which sent said use start notice.

18. An information processing apparatus according to claim 17, wherein said host computer includes means, responsive to said user start notice from said terminal system, for deleting the corresponding entry of said routing table, and storing the deleted entry contents in said file.

* * * * *

UNITED STATES PATENT AND TRADEMARK OFFICE
CERTIFICATE OF CORRECTION

PATENT NO. : 5,067,154　　　　　　　　　　Page 1 of 2
DATED : November 19, 1991
INVENTOR(S) : Yoshiyuki Hosobuchi, et al It is certified that error appears in the above-indentified patent and that said Letters Patent is hereby corrected as shown below:

| Column | Line | |
|---|---|---|
| 1 | 10 | Change "works" to --work--. |
| 1 | 23 | After "there" insert --is--. |
| 3 | 12 | After "DESCRIPTION" delete "OF THE". |
| 3 | 13 | Delete "EMBODIMENTS". |
| 3 | 25 | After "51" insert --is--. |
| 3 | 67 | After "user," delete "and". |
| 4 | 9 | After "11" insert --is--. |
| 4 | 52 | After "what" insert --the--. |
| 4 | 61 | After "type" insert --,--. |
| 5 | 30 | Change "rejected to start carrying out" to --prevented from starting to carry out--. |
| 5 | 44 | After "$30_2$ are" delete "a". |
| 5 | 45 | Before "local" delete "a". |
| 5 | 46 | Change "$50_2$" to --$50_n$--. |
| 6 | 36 | Change "us" to --use--. |
| 7 | 60 | After "file" insert --,--. |

UNITED STATES PATENT AND TRADEMARK OFFICE
CERTIFICATE OF CORRECTION

PATENT NO. : 5,067,154            Page 2 of 2
DATED : November 19, 1991
INVENTOR(S) : Yoshiyuki Hoshobuchi, et al It is certified that error appears in the above-indentified patent and that said Letters Patent is hereby corrected as shown below:

| Column | Line | |
|---|---|---|
| 8 | 12 | After "respectively" insert --,--. |
| 8 | 28 | After "system" insert --,--. |
| 8 | 44 | After "storing" insert --,--. |
| 10 | 3 | After "comprising" insert --means for checking--. |
| 10 | 16 | Change "phabets" to --phabet--; before numeral" delete "and". |
| 10 | 26 | After "respectively" insert --,--. |

Signed and Sealed this

Twenty-fourth Day of August, 1993

*Attest:*

BRUCE LEHMAN

*Attesting Officer*     *Commissioner of Patents and Trademarks*